(12) United States Patent
Prasanna Kumar et al.

(10) Patent No.: US 10,216,799 B2
(45) Date of Patent: Feb. 26, 2019

(54) FEDERATED DATABASE SYSTEM (71) Applicant: Telefonaktiebolaget L M Ericsson (publ), Stockholm (SE)

(72) Inventors: Manoj Prasanna Kumar, Chennai (IN); Subramanian Shivashankar, Chennai (IN); Jawad Mohamed Zahoor, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 494 days.

(21) Appl. No.: 14/434,372

(22) PCT Filed: Oct. 19, 2012

(86) PCT No.: PCT/EP2012/070819
§ 371 (c)(1),
(2) Date: Apr. 8, 2015

(87) PCT Pub. No.: WO2014/060050
PCT Pub. Date: Apr. 24, 2014

(65) Prior Publication Data
US 2015/0234831 A1 Aug. 20, 2015

(51) Int. Cl.
*G06F 17/30* (2006.01)
*G06F 17/00* (2006.01)
(52) U.S. Cl.
CPC .... *G06F 17/3053* (2013.01); *G06F 17/30442* (2013.01); *G06F 17/30598* (2013.01); *G06F 17/30867* (2013.01)
(58) Field of Classification Search
CPC ......... G06F 17/30566; G06F 17/30545; G06F 17/30289; G06F 17/30321; G06F 17/30563; G06F 17/30893; G06F 17/30557; G06F 17/30442; G06F 17/30864; G06F 17/30377; G06F 17/30389; G06F 17/30448; G06F 17/30498; G06F 17/3056; G06F 17/30923;
(Continued)

(56) References Cited

U.S. PATENT DOCUMENTS 7,146,357 B2 12/2006 Suzuki et al.
8,326,826 B1 * 12/2012 Upstill .............. G06F 17/30873
707/723

(Continued)

OTHER PUBLICATIONS

International Search Report, PCT Application No. PCT/EP2012/070819, dated Jul. 5, 2013.
(Continued)

*Primary Examiner* — Yicun Wu
(74) *Attorney, Agent, or Firm* — Sage Patent Group (57) ABSTRACT

Query handling devices in a federated database system and related methods and computer program products for handling queries in the federated database system are disclosed. The query handling device receives database queries directed towards a group of databases from several applications and filters the queries based on common query rules such as common query syntax, investigates the queries that have passed the filtering, and sends the investigated queries to the databases. The investigation includes prioritising between at least some queries according to a query prioritisation scheme. The prioritised queries are sent according to the query prioritisation scheme.

13 Claims, 4 Drawing Sheets

(58) Field of Classification Search
CPC ............. G06F 11/1471; G06F 11/1474; G06F 17/30292; G06F 17/30303; G06F 17/30339; G06F 17/30371; G06F 17/30463; G06F 17/30477; G06F 17/30536; G06F 17/30589; G06F 17/30598; G06F 17/30873; G06F 17/30917; G06F 17/30985; G06F 2201/80; G06F 9/48; G06F 17/30336; G06F 17/30424; G06F 17/30445; G06F 17/30457; G06F 17/30469; G06F 17/3053; G06F 17/30554; G06F 17/30575; G06F 17/30584; G06F 17/30867; G06F 17/3087; G06F 17/30935; G06F 17/30938; G06F 17/30958; G06F 19/322; G06F 19/34
See application file for complete search history.

(56) References Cited

U.S. PATENT DOCUMENTS

| | | | |
|---|---|---|---|
| 2004/0103088 A1* | 5/2004 | Cragun | ............. G06F 17/30545 |
| 2004/0186829 A1 | 9/2004 | Suzuki et al. | |
| 2008/0176567 A1* | 7/2008 | Oba | ................... H04W 36/005 |
| | | | 455/436 |
| 2009/0132611 A1 | 5/2009 | Brown et al. | |
| 2011/0246481 A1 | 10/2011 | Narayanan et al. | |
| 2012/0278293 A1* | 11/2012 | Bulkowski | ........ G06F 17/30575 |
| | | | 707/703 |

OTHER PUBLICATIONS

Written Opinion of the International Searching Authority, PCT Application No. PCT/EP2012/070819, dated Jul. 5, 2013.

Written Opinion of the International Preliminary Examining Authority, PCT Application No. PCT/EP2012/070819, dated Sep. 29, 2014.

International Preliminary Report on Patentability, PCT Application No. PCT/EP2012/070819, dated Jan. 23, 2015.

Chinese Office Action dated Jun. 13, 2017 for Corresponding PCT Application No. 201280076494.0 filed on Oct. 15, 2015; OA 8 pages; Translation of OA 3; Summary 1 page.

* cited by examiner

FEDERATED DATABASE SYSTEM

CROSS REFERENCE TO RELATED APPLICATION

This application is a 35 U.S.C. § 371 national stage application of PCT International Application No. PCT/EP2012/070819, filed on 19 Oct. 2012, the disclosure and content of which is incorporated by reference herein in its entirety. The above-referenced PCT International Application was published in the English language as International Publication No. WO 2014/060050 A1 on 24 Apr. 2014.

TECHNICAL FIELD

The invention relates to federated database systems. More particularly, the invention relates to a query handling device in a federated database system as well as to a method, computer program and computer program product for handling queries in a federated database system.

BACKGROUND

Systems like mobile telephone systems may comprise a variety of databases of different types, which databases may be queried by different applications, such as by core applications in a core network or by third party applications. This type of environment is thus also a federated environment.

In recent times, software applications and users are more concerned about efficiency of the databases with regard to latency/delay. Users of these software applications do not always prefer to explore the data model of the database system to write optimized queries. However, in order to write optimized queries, users have to understand the capabilities and pitfalls of the underlying data store of the database system that the application uses.

Each such database has a data-store like MySQL, Oracle etc. in its data tier. Restrictions are imposed on the queries that are applied, depending on what data-store it uses in its data tier, as each data store has its own limitations and characteristics. For example, consider a database that uses MySQL as its data-store. It imposes query restrictions like "User cannot modify a table and select from the same table in a sub-query". Similarly, a system that uses Hbase as a data-store restricts joins in queries. Such query restrictions are imposed to ensure the effective usage of resources.

Apart from restrictions in constructing queries, other restrictions pertaining to data access are also imposed. For example some systems restrict a query from one user, say user A, to read/update data in a table created by another user, say user B. Such restrictions in queries protect privacy and integrity of the data.

In a federated database environment, multiple applications query multiple data-stores. In such an environment, it is hard to impose an exhaustive set of generic restrictions on queries that will optimize the performance in all data-stores.

Furthermore, in a federated database environment, there can be cases where an application might not have information about which data-store it is querying. In such cases, the problem of imposing query restrictions becomes more complex. More often a middleware takes care of data transfer from/to the application to/from the underlying data-store. Still the middleware need not have knowledge about the data-store of the database that the application uses. Without knowing which data-store is used, it is difficult to impose query restrictions.

Furthermore in such a federated system there is the risk of bottlenecks. Queries may have to wait unacceptable long times for their responses.

Furthermore, there is currently no way of handling queries in a federated system when there is a sudden outburst of queries.

There is thus a need for improvement with regard to some or all of the above-mentioned problems.

SUMMARY

One object of the invention is thus to provide an improvement in the handling of queries in a federated database system.

This object is according to a first aspect of the invention achieved by a query handling device in a federated database system. The query handling device is configured to receive database queries directed towards a group of databases from several applications. It also comprises:

a query scheduler module configured to investigate the queries, where the investigation comprises prioritising between at least some queries according to a query prioritisation scheme, and send the investigated queries to the databases. The prioritised queries are sent according to the query prioritisation scheme.

This object is according to a second aspect also achieved by a method for handling queries in a federated database system. The method is performed in a query handling device of the system and comprises the steps of:

receiving database queries directed towards a group of databases from several applications, investigating the queries, where the investigation comprises prioritising between at least some queries according to a query prioritisation scheme, and sending the investigated queries to the databases. The prioritised queries are sent according to the query prioritisation scheme.

The object is according to a third aspect of the invention also achieved through a computer program for handling queries in a federated database system. The computer program comprises computer program code which when run in a query handling device causes the query handling device to:

receive database queries directed towards a group of databases from several applications, investigate the queries, where the investigation comprises prioritising between at least some queries according to a query prioritisation scheme, and send the investigated queries to the databases. The prioritised queries are sent according to the query prioritisation scheme.

The object is according to a fourth aspect furthermore achieved by a computer program product for handling queries in a federated database system, where the computer program product is provided on a data carrier and comprises the computer program code according to the third aspect.

The invention according to the above-mentioned aspects have a number of advantages. The prioritizing may remove bottlenecks. The use of prioritization may remove starving conditions, where an end user might wait for a long time for the results of a query.

In an advantageous variation of the first aspect, the query scheduler module comprises a clustering unit that clusters queries based on query execution time, assigns cluster priorities to clusters based on the execution times of the queries of the clusters, matches a query to a cluster and assigns a query priority to the query based on the cluster priority of the corresponding cluster, a ranking unit that ranks the applications and a selection unit that select queries for execution based on query priority and application rank.

In a corresponding variation of the second aspect, the method further comprises clustering queries based on query execution time, assigning cluster priorities to clusters based on the execution times of the queries of the clusters and ranking the applications. In this variation the prioritising then comprises matching a query to a cluster, assigning a query priority to a query based on the cluster priority of the corresponding cluster and selecting queries for execution based on query priority and application rank.

These variations provide the further advantage of providing a flexible association of a location with a function in both time and space, which further enhances the flexibility with which locations can be selected and used.

According to a further variation of the first aspect, the clustering unit determines the similarity of a received query with the clusters and matches the query to a cluster having similar queries.

According to a corresponding variation of the second aspect, the prioritising further comprises determining the similarity of a received query with the clusters and matching the received query to a cluster having similar queries.

According to yet another variation of the first aspect, the ranking unit ranks an application based on the nature of the application, based on a database accessing frequency of the application and based on user priority.

According to a corresponding variation of the second aspect, the ranking of an application is made based on the nature of the application, based on database accessing frequency of the application and based on user priority.

According to a further variation of the first aspect, the selecting unit prioritizes queries according to query priority and uses application rank if the query priorities of two or more queries are the same.

According to a corresponding variation of the second aspect, the prioritising of queries is made according to query priority. Application rank is then used if the query priorities of two or more queries are the same.

According to yet another variation of the first aspect, the query handling device further comprises a query filter module that filters the received queries based on common query rules, where the common query rules may comprise a common querying syntax.

According to a corresponding variation of the second aspect, the method further comprises filtering the received queries based on common query rules, where the common query rules may comprise a common querying syntax.

According to a further variation of the first aspect, the query handling device also comprises a query handling evaluation module that investigates the processing capability of system elements handling the query of an application, compares the processing capability with a capability criterion and informs the query scheduler module of the result. The query scheduler module in turn allows the query to be immediately performed if the capability criterion is fulfilled and otherwise applies prioritisation according to the query prioritisation scheme.

According to a corresponding variation of the second aspect, the investigating comprises investigating the processing capability of system elements handling a query of an application, comparing the processing capability with a capability criterion. The query is then immediately performed if the capability criterion is fulfilled and otherwise the prioritisation is performed according to the query prioritisation scheme.

According to another variation of the first aspect, the query handling device comprises a reporting module that reports the progress of the queries to the applications.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

The invention is generally directed towards a federated database system where there are several applications sending queries to several databases. In such a system an application should not have to know of the peculiarities of a certain database when providing queries. It should thus be able to operate in the same way in respect of all databases irrespective of the different types that exist. Furthermore, queries should be handled in an efficient manner for avoiding bottlenecks.

Figure 1:
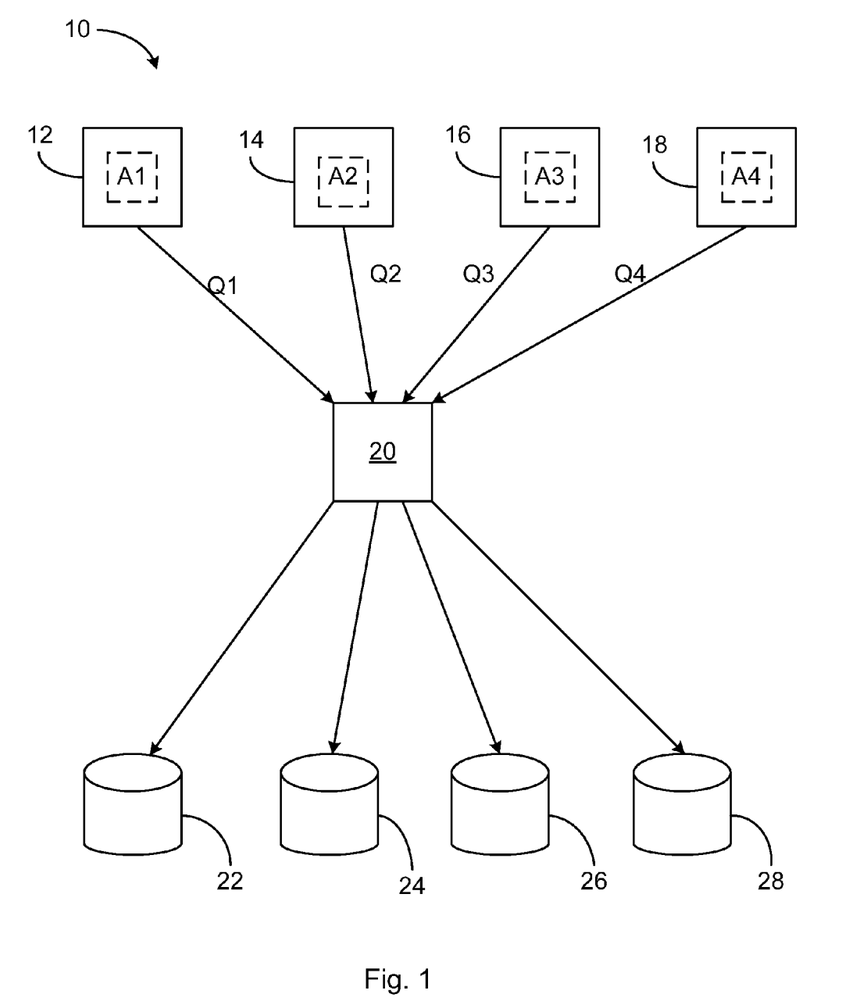
FIG. 1 schematically shows a number of applications communicating with a number of databases via a query handling device.

In FIG. 1 there is shown a federated database system 10, comprising a number of querying devices. There is here a first querying device 12, a second querying device 14, a third querying device 16 and a fourth querying device 18. In each of these querying devices 12, 14, 16 and 18 there is furthermore running an application which sends queries destined for different databases. There is here a first application A1 in the first querying device 12, a second application A2 in the second querying device 14, a third application A3 in the third querying device 16 and a fourth application A4 in the fourth querying device 18. The first application A1 sends a first query Q1, the second application A2 sends a second query Q2, the third application A3 sends a third query Q3 and the fourth application A4 sends a fourth query Q4. The federated database system 10 may furthermore be a part of a a larger system, such as a mobile communication system, like Long Term Evolution (LTE) or Wideband Code Division Multiple Access (WCDMA). A mobile communication system may furthermore comprise a radio access network and a core network, where the core network may provide core network functionality such as keeping track of mobile terminals and their locations. This type of functionality may be based on one or more home location registers (HLR) that may need to use the databases of the federated database system 10. It is also known for various types of third party application servers connecting to such a mobile communication system. Also these servers may need to employ the federated database system 10.

The above mentioned queries are received by a query handling device 20, which in turn distributes them to various databases. For this reason the query handling device 20 communicates with a first database 22, with a second database 24, with a third database 26 and with a fourth database 28.

Figure 2:
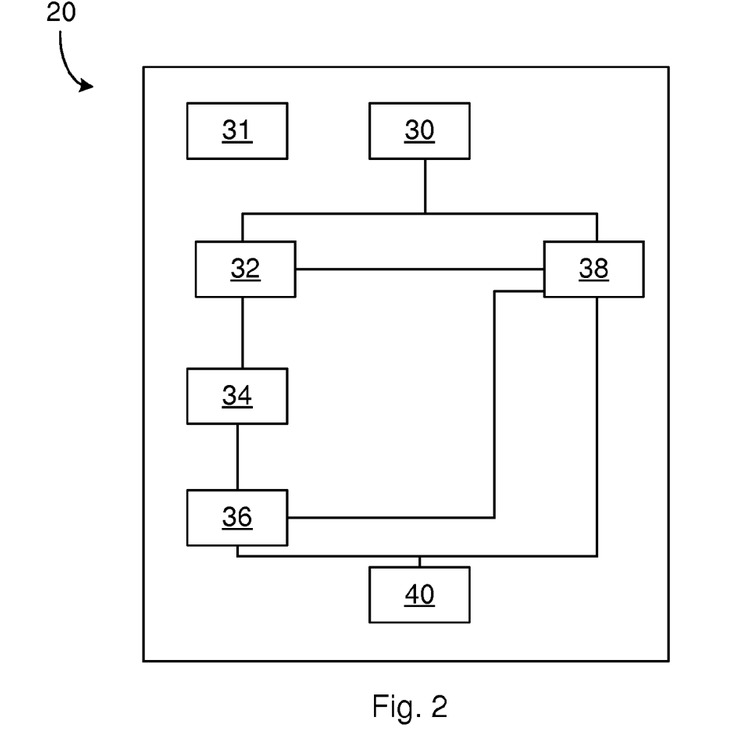
FIG. 2 shows a block schematic of the query handling device.

FIG. 2 shows a block schematic of the query handling device 20. It comprises an application interface 30, which is connected to a query filter module 32 as well as to a reporting module 38. The query filter module 32 is connected to a query handling evaluation module 34, which in turn is connected to a query scheduler module 36. Also the reporting module 38 is connected to the query scheduler module 36. The query scheduler module 46 and the reporting module 38 are further connected to a database interface 40. There is finally an initiating module 31.

Here it may be mentioned that the applications A1, A2, A3 and A4 may be provided in an application layer, while the query handling device 20 and databases 22, 24, 26 and 28 may be provided in a federated data layer.

Figure 3:
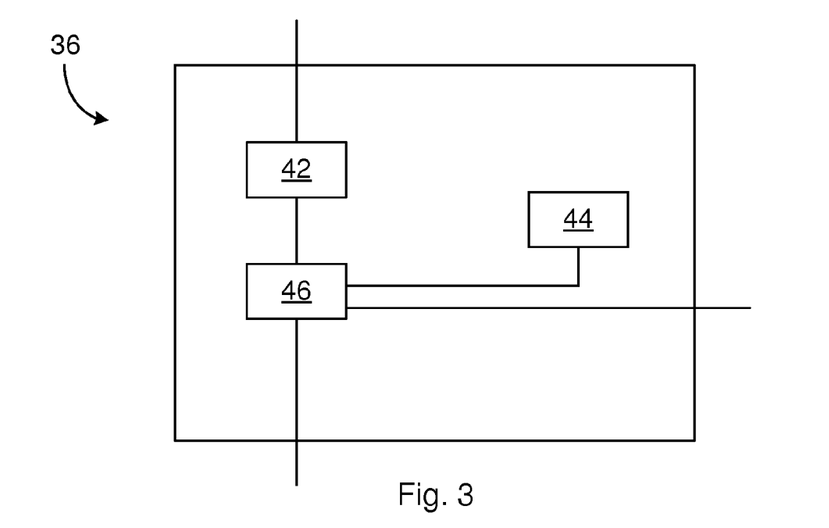
FIG. 3 shows a block schematic of a query scheduler module of the query handling device.

FIG. 3 shows a block schematic of the query scheduler module 36. It comprises a clustering unit 42 for connection to the query handling evaluation module 34 as well as a ranking unit 44. These two units are furthermore connected to a selection unit 46, which selection unit 46 is to be connected to the database interface as well as to the reporting unit.

Figure 4:
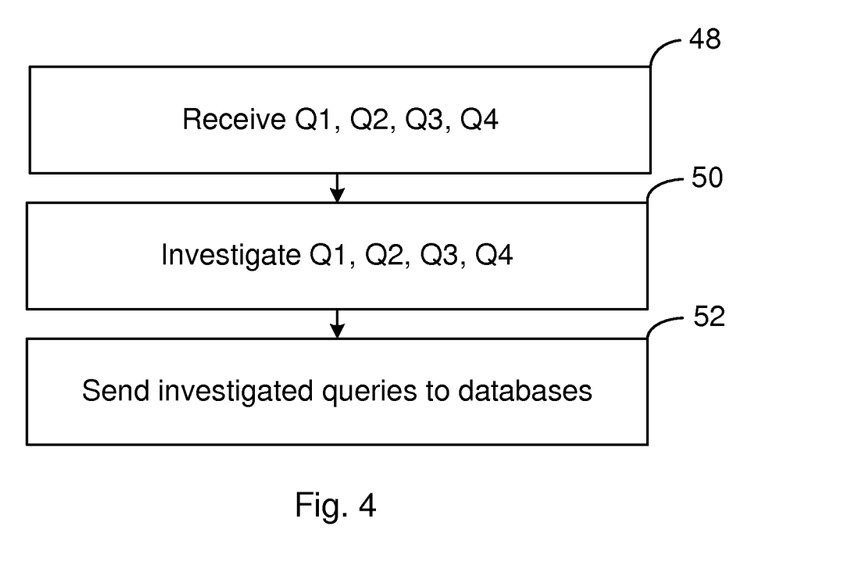
FIG. 4 shows a flow chart of a first embodiment of a method for handling queries in a federated database system.

A first embodiment will now be described with reference being made to the previously mentioned figures as well as to FIG. 4, which shows a number of method steps in a first embodiment of a method for handling queries in a federated database system.

The query handling device 20 receives database queries Q1, Q2, Q3, Q4 at the application interface 30, which queries Q1, Q2, Q3, Q4 are directed towards the group of databases 22, 24, 26, 28 from the different applications A1, A2, A3, A4 in the querying devices 12, 14, 16 and 18, step 48. These queries should be handled so that bottlenecks are avoided.

In order to enable this, the queries are provided to the query scheduler module 36, which investigates the queries Q1, Q2, Q3, Q4, step 50. This investigation may comprise prioritising between at least some queries according to a query prioritisation scheme. The prioritisation scheme may use any of a number of different principles. It may for instance be based on the execution time of the query, where a short execution time may get a higher priority than a long execution time. The execution time of a query may furthermore be predicted, and this prediction may be based on knowledge of known execution times of similar queries. The prioritization may furthermore be dynamic, i.e. only employed when there is a queue of queries in the query handling device.

After the prioritisation the query scheduler module 36 sends the investigated queries to corresponding databases 22, 24, 26 and 28 via the database interface 40, step 52, where queries having been prioritised are thus sent according to the query prioritisation scheme.

It can in this first embodiment be seen that the reporting module 38, query filter module 32 and query handling evaluation module 34 are not used, why these may be omitted from the query handling device.

Furthermore, the prioritizing may be made in order to avoid queries with lower execution time (high priority) waiting for completion of queries with higher execution times (low priority). If there is no prioritization of this type, a simple query may take a longer time to respond to due to the query being queued while a complex query is being completed. This might lead to starving conditions, where an end user might wait for a long time. § Such a situation is thus avoided in the first embodiment.

Figure 5:
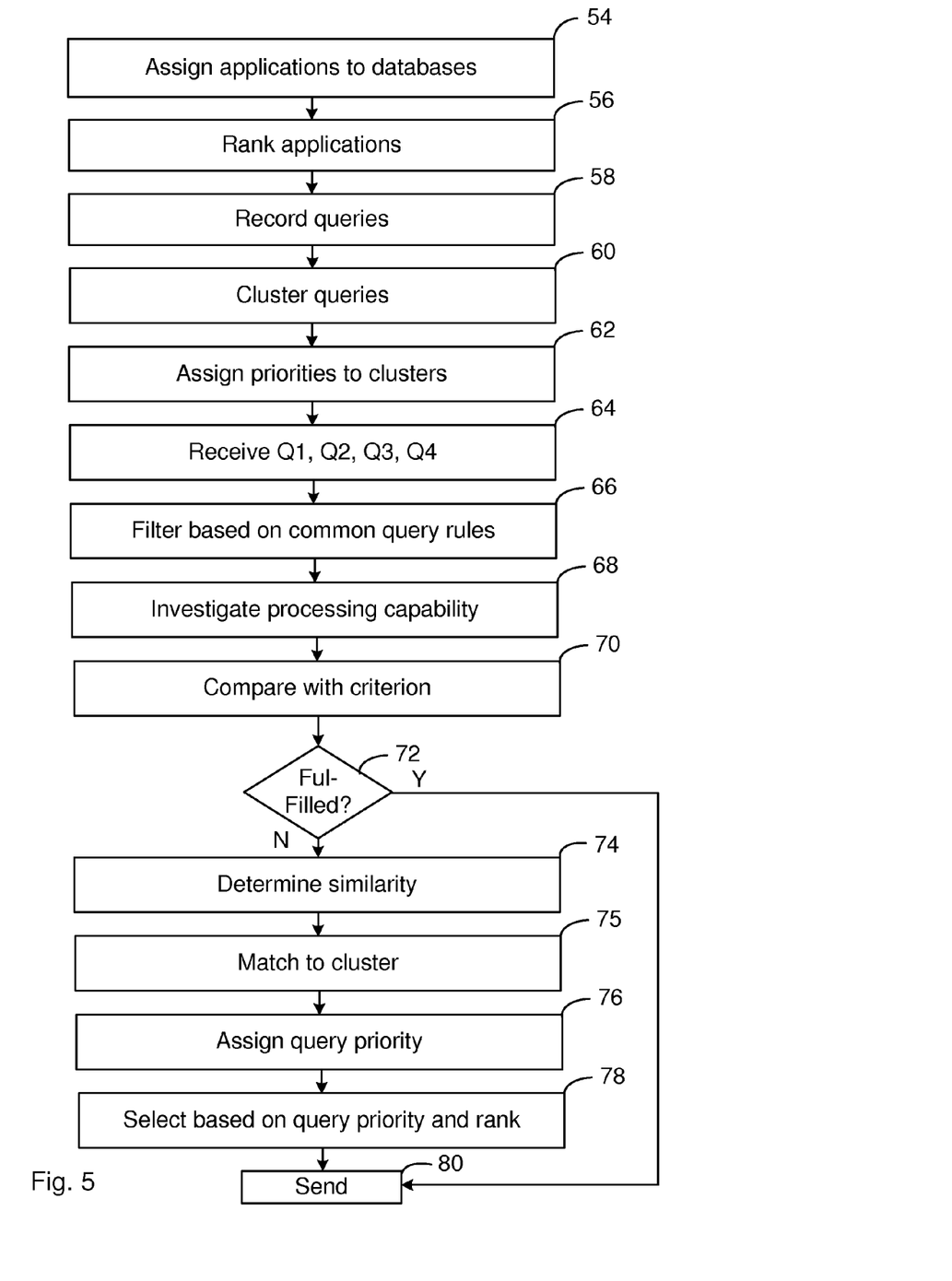
FIG. 5 shows a flow chart of a second embodiment of a method for handling queries in a federated database system, and FIG. 6 schematically shows a computer program product comprising a data carrier with computer program code for implementing the method for handling queries in a federated database system.

Now a second embodiment will be described with reference being made to FIGS. 1-3 together with FIG. 5, which shows a number of method steps in a method for handling queries in a federated database system according to the second embodiment.

The databases 22, 24, 26 and 28 all comprise processors such as central processing units (CPU) and data-stores in the form of memories.

Assume a federated system where applications do not know which data-store they query. In this situation the query handling device 20 takes care of data transfer from/to the application to/from a most suitable data-store through a dedicated connection.

In order to do this, the initiation module 31 assigns, at application deployment, the applications to data-stores of databases, step 54. The initiating module 31 may here choose the most optimum data-store for an application. The optimum data-store for the application may be chosen after analysing the data and queries of the application. For example, the initiating module 31 may choose HBase for an application with large volume of data and less relationship among entities requiring a low response time. The initiating module 31 then establishes a dedicated connection between the application and the chosen data-store. The query filter module 32 and query scheduler module 36 are then enabled for the connection. It may here be mentioned that an assigned application is not aware of the type of database or data-store. The query handling device takes care of all the data transfer between the application and the data-store.

The ranking unit 44 of the query scheduler module 36 furthermore ranks the applications, step 56. The ranking is also typically performed at deployment of the applications.

The applications may be ranked based on initial sets of labels provided by a system administrator like Rank(Application 1)>Rank(Application 2) and labels generated from application's behavioural pattern.

Applications may be ranked because their importance differ according to their complexity and usage. For example, a query from a core-network application may be more important than a query from a third party application for a telecom end-user of the federated database architecture.

Basic information about the application is captured by the query handling device 20 when the application is deployed. Basic information may comprise nature of the application (core application/third party application), database accessing frequency of the application such as read/write frequency. Basic ranking rules may thus be predefined by the query handling device. For example, an application with high read/write frequency may receive a higher rank than an application with lower read/write frequency. Priority of users can also be considered for ranking applications. For example, a user with a higher number of applications may get a higher priority than a user with a lower number of applications.

Thereafter the clustering unit 42 of the query scheduler module 36 is initialized. This is done through the query handling device 20 first recording queries from the different applications, step 58.

Queries are recorded for a period of time t defined by the query handling device 20. The execution time of the queries is also recorded.

Queries are then clustered by the clustering unit 42, step 60. The clustering may be based on the execution time, i.e. queries with similar execution time may be grouped together.

The clustering may be based on the execution times of the queries and performed using existing techniques like k-means clustering. According to these principles, each query is represented using the 1-d execution time and execution times are clustered using K-Means. This type of clustering is for instance described in the R Journal, 2011, "Ckmeans.1d.dp: Optimal k-means Clustering in One Dimension by Dynamic Programming", Haizhou Wang and Mingzhou Song, which is herein incorporated by reference.

Thereafter the clustering unit 42 assigns cluster priorities to each of the resulting clusters based on execution time, step 62. Each cluster thus receives a corresponding cluster priority. The cluster priorities may furthermore be assigned to the resulting clusters based on the average execution time found for the clusters. The cluster with queries having the shortest execution time may then get the highest cluster priority and the cluster with queries having the longest execution time may get the lowest cluster priority. Computed clusters may then be stored for prioritizing queries in the future.

After these measures have been performed it is possible for the query handling device 20 to start to receive and handle queries in an efficient manner.

As in the first embodiment the method therefore then continues with the query handling device 20 receiving the queries Q1, Q2, Q3 and Q4 from the applications A1, A2, A3 and A4, step 64. The queries are also in this embodiment received in the query interface 30. These queries are to be provided according to a general structure so that they can be handled for different database types. The queries should as an example be possible to use with MySQL, Oracle or HBase databases.

The queries Q1, Q2, Q3 and Q4 are then forwarded to the query filter module 32, which filters the queries based on common query rules, step 66.

The filtering may be a filtering where static restrictions are imposed on the queries. The query filter module 32 may for instance impose restrictions like "No regular expressions are allowed in keys". For example assume a query "Select name,age from my-database database where depart*name='Research'". This query may be filtered out by the query filter module 32 because it has a regular expression (depart*name) in the key 'department name'. The query filter module 32 sends the queries that have been filtered out to the reporting module 38, which may inform the application sending the query that the query has been rejected.

Some of the possible restrictions are given below:
1. Multiple updates of a table in a single query is not allowed.
2. A common querying syntax should be followed as the system may communicate with any data-store according to the characteristics of the application. If a specific querying syntax is followed, it might result in an error if the underlying data-store is compatible with a different syntax. For example, assume that an application generates a query "Select employeename from mydatabase where department='Research'". This is a valid SQL query. However, it might end up in an error if the underlying data-store is Hbase because Hbase follows a different query syntax. The common query syntax can be as follows.

Select Query: Select tablename, column1,column2. . . columnn

Insert Query: Insert tablename, column1=value1, column2=value2

Delete Query: Delete tablename

3. No regular expressions are allowed in keys. For example, a query "Select employeename from my-database where depa*='Research'" is not allowed because it has a regular expression (depa*) in a row key department.
4. Reading multiple tables in a single query is not permitted as it is not allowed in certain data-stores like Hbase.
5. Kindless queries that try to view all the entities in a data-store are not allowed as data created by other applications and the system (query handling device) should not be visible to the application.
6. Filters on more than one property is not allowed as certain data-stores like Hbase do not capture relationships among properties.

Queries following these restrictions are accepted and forwarded to the query handling evaluation unit 34.

The query handling evaluation unit 42 then investigates the processing capability of the system elements handling the query for an application, step 68.

The assigned data-stores have system elements like processors, such as CPUs and memories that are to handle the queries. The query handling evaluation unit 42 investigates the processing capability of these system elements. It does this through monitoring various CPU and memory parameters of these system elements. If the database to which the query is addressed is idle, then the query is scheduled for execution immediately. However, if the system is busy, the query is prioritized by the query scheduler module 36.

The investigating of processing capability may comprise investigating various Central Processing Unit (CPU) and memory parameters of the data-store in question. The CPU parameters monitored may be CPU Load average, available free RAM space and cache size. The memory parameter monitored may be the available space in the disk. If for instance the first application A1 has been assigned to the first database 22, the processor and memory parameters for the data-store of this database are investigated.

The processing capability for the queries are then compared with a processing capability criterion, step 70, and if the criterion is fulfilled, step 72, the query is immediately sent to the assigned database without being handled by the query scheduler module 36, step 80. The criterion may for instance be considered to be fulfilled if the system that contains the data-store of the application is free i.e., the CPU load average is less than a first threshold T1 and the available free RAM space is greater than a second threshold T2, where the threshold values T1 and T2 may be set by the query handling device 20 based on the type of processor that the data-store uses.

If the criterion is not fulfilled, step 72, i.e. the system is considered to be busy, then the query scheduler module 36 is informed and the queries are forwarded to this module.

In the query scheduler module 36, queries are immediately forwarded to the database interface 40, if the corresponding criterion is fulfilled, step 62. However, if the criterion is not fulfilled, step 62, the clustering unit 42 of the query scheduler module 36 handles the queries.

The clustering unit 42 first matches a query to a cluster, step 74, which may be done via a determination of the similarity of a query to the different clusters.

The Execution time of the query may be predicted by computing the similarity between the query and all other queries near the centroid of the clusters.

Similarity may be computed by using existing techniques like cosine similarity, for instance as described in Journal of Machine Learning Research 10 (2009) 747-776, "Similarity-based Classification: Concepts and Algorithms", Yihua Chen, Eric K. Garcia, Maya R. Gupta, Ali Rahimi and Luca Cazzanti, which is herein incorporated by reference.

Attributes like fields queried and type of query may be considered for computing similarity.

After the similarity has been determined, the query may thus be matched to the cluster that is most similar, step 75. The query may then be assigned a query priority that is based on the cluster priority of the corresponding cluster, step 76, i.e. that is based on the cluster priority of the cluster that in the matching was found to be most similar to the investigated query. This may be done through assigning the query to the cluster. Thereby the query priority given to the query may be the same as the cluster priority of the associated cluster, which associated cluster may thus be a cluster having queries that are similar to the query in question.

A query may thus be assigned to a cluster that has similar queries. Assume that $(x_1, x_2, \ldots x_n)$ is a set of execution times of queries $(q_1, q_2, \ldots q_n)$. K-means clustering algorithm partitions n observations of execution times into k clusters. Given a set of k centroids $m_1^{(1)}, \ldots, m_k^{(1)}$ and a query $x_p$, the algorithm does the following computation.

$$S_i^{(t)} = (x_p : \|x_p - m_i^{(t)}\| \le \|x_p - m_j^{(t)}\| \Theta 1 \le j \le k) \quad (1)$$

where each $x_p$ is assigned to only one cluster $s_i(t)$.

Once query is assigned to a cluster, its execution time is predicted by $$E(Q_t) = \frac{E(Q_1) + E(Q_2) + \ldots E(Q_n)}{n} \quad (2)$$

Note that this is the centroid value of the corresponding cluster which is already pre-computed.

where, $E(Q_t)$=Execution time of a query $Q_t$ n=Number of queries in cluster and the priority of the query will be the same as the priority of the cluster.

It can in this way be seen that the clustering unit 42 may assign a query priority to a query that is the same as the cluster priority of a cluster having similar queries.

After prioritization of queries, they are selected for execution by the selecting unit 46 according to their query priority while considering the rank of the corresponding application, step 78. This means that the selecting unit 46 connected to the ranking unit 44 in order to obtain the ranks of the applications for being used when selecting queries.

In this way queries are scheduled based on the ranks of the applications from which they originate and their query priorities.

A query is thus scheduled for execution based on the query priority. If a query with high query priority is waiting in queue for a query with a lower query priority to complete execution, the query with lower query priority can be preempted if the underlying data-store supports preemption. Conflicts in priorities of queries may be resolved by considering the rank of the application that generated the queries. For example, assume query Q1 and query Q2 have rank 1. Q1 is generated by application A1 and Q2 is generated by application A2. Also assume R(A1)>R(A2) where R is the rank of an application. In this case, Q1 is executed first because the application A1 that generated the query has a higher rank. The selecting unit thus prioritizes queries according to query priority and uses application rank if the query priorities of two or more queries are the same. In case there is a common conflict in the priorities of queries and rank of applications, a query is selected at random and scheduled for execution. Assume that R(A1)=R(A2) in the above example. In this case Q2 might be selected at random for execution.

After a query has been selected in this way it is then sent to the associated database, step 80, and the results will appear in the data-store that is associated with the application.

Furthermore, while executing an insert query, the available space in the disk associated with the query may be considered. If the system containing the data-store of the application does not have sufficient space to store the records to be inserted, then the query may be buffered until the disk capacity is increased.

Throughout the operation of the query handling device 20, the reporting module 38 monitors and reports the status of the queries to the applications A1, A2, A3 and A4. It does for instance report the rejected queries and also the approximate time of execution of accepted queries.

The reporting module 38 thus informs the applications about the status of queries. Messages used by the reporting module may be as follows.

1. Query Executed.
2. Query Rejected due to violation in restrictions.
3. Query scheduled for execution shortly Based on the status of the query, one among the above mentioned messages may be displayed to inform the application about the status of the query.

It may be seen that the query handling device improves the performance of a federated database system by imposing static and dynamic query restrictions.

The invention also has a number of further advantages. Through employing static restrictions on queries, the query handling device ensures that queries generated by the applications don't result in an error due to syntax issues. Through employing dynamic restrictions on queries a performance bottleneck in the part of the system where the data-store is provided is avoided. Query level scheduling ensures high performance and stability as system failure due to overload is avoided completely. Through combining static and dynamic restrictions both syntactic conflicts and performance issues are resolved in the federated database architecture. The use of application ranking ensures that critical applications are always stable in terms of data update/retrieval. The use of query prioritizing with support for preemption avoids queries with lower execution times (high priority) waiting for completion of queries with longer execution times (low priority). If there is no query prioritizing, a scenario may occur where the responding time for a simple query is excessively long due to the waiting time for completion of the complex query. This might lead to starving conditions, where an end user might wait for a long time. The proposed method can avoid such scenarios. Furthermore, the stability of the application and the system is guaranteed in case of sudden outburst of queries. For example, a Home Location Register (HLR) may perform a large number of batch inserts during night time.

The query handling device may be provided in the form of a processor with associated program memory including computer program code for performing the functionality of the query handling device.

Figure 6:
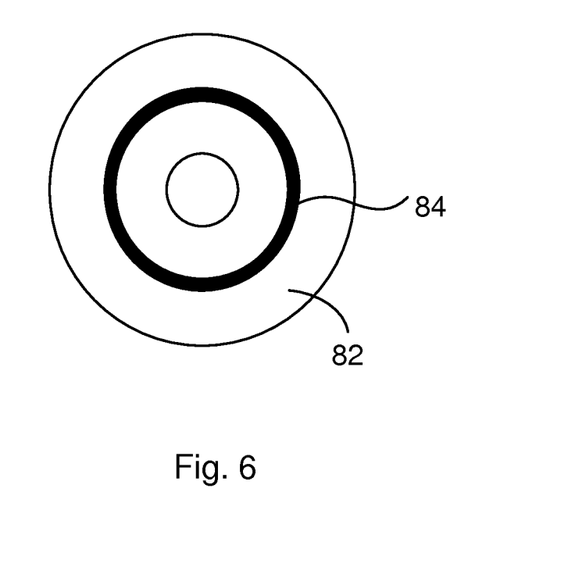

A computer program may also be a computer program product, for instance in the form of a computer readable storage medium or data carrier, like a CD ROM disc or a memory stick, carrying such a computer program with the computer program code, which will implement the functionality of the above-described query handling device. One such data carrier 82 with computer program code 84 is schematically shown in FIG. 6.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A query handling device in a federated database system, the query handling device being configured to receive database queries directed towards a group of databases from several applications and comprising:
    an initiation module configured to assign, at application deployment, the applications to data-stores of said databases,
    a query scheduler module configured to receive the database queries from the several applications, investigate the queries, where the investigation comprises prioritising between at least some queries according to a query prioritisation scheme, and send the investigated queries to the databases, where queries having been prioritised are sent according to the query prioritisation scheme and
    a query handling evaluation module configured to investigate the processing capability of system elements handling the query of an application, compare the processing capability with a capability criterion and inform the query scheduler module of the result, wherein the query handling evaluation module monitors one or more processing capability parameters of the system elements handling the query,
    wherein the query scheduler module is further configured to allow the query to be immediately sent to the assigned database and immediately performed if the capability criterion is fulfilled and otherwise to apply prioritisation according to the query prioritisation scheme, and
    wherein the query scheduler module comprises a clustering unit configured to cluster queries based on query execution time, assign cluster priorities to clusters based on the execution times of the queries of the clusters, a ranking unit configured to rank the applications and a selection unit configured to select queries for execution based on query priority and application rank, and wherein, for an individual query, the query scheduler module is configured to select a database from among the group of databases and to send the individual query to the selected database based on the investigation of the query by the query scheduler module and the result output by the query handling evaluation module.

2. The query handling device according to claim 1, wherein the clustering unit is configured to determine the similarity of a received query with the clusters and match the received query to a cluster having similar queries.

3. The query handling device according to claim 1, wherein the ranking unit is configured to rank an application based on the nature of the application, based on a database accessing frequency of the application and based on user priority.

4. The query handling device according to claim 1, wherein the selecting unit is configured to prioritize queries according to query priority and to use application rank based on determining that the query priorities of two or more queries are the same.

5. The query handling device according to claim 1, further comprising a query filter module configured to filter the received queries based on common query rules.

6. The query handling device according to claim 5, wherein the common query rules comprises a common querying syntax.

7. The query handling device according to claim 1, further comprising a reporting module configured to report the progress of the queries to the application.

8. A method for handling queries in a federated database system, the method being performed in a query handling device of the system and comprising the steps of:
    assigning, at application deployment, the applications to data-stores of said databases.
    clustering queries based on query execution time, assigning priorities to clusters based on the execution times of the queries of the cluster, ranking the applications,
    receiving database queries directed towards a group of databases from several applications,
    investigating the queries, where the investigation comprises prioritising between at least some queries according to a query prioritisation scheme, which prioritization comprises selecting queries for execution based on cluster priority and application rank, and
    sending the investigated queries to the databases, where queries having been prioritised are sent according to the query prioritisation scheme, wherein the investigating comprises investigating the processing capability of system elements handling a query of an application, comparing the processing capability with a capability criterion, wherein the processing capability is determined based on one or more processing capability parameters of the system elements handling the query,
    where the query is immediately send to the assigned database and immediately performed if the capability criterion is fulfilled and otherwise the prioritisation is performed according to the query prioritisation scheme, and wherein, for an individual query, the method comprises selecting a database from among the group of databases and sending the individual query to the selected database based on the investigation of the query and the processing capability of the system elements.

9. The method according to claim 8, wherein the prioritising further comprises determining the similarity of a received query with the clusters and the matching comprises matching the query to a cluster having similar queries.

10. The method according to claim 8, wherein the ranking of an application is made based on the nature of the application, based on database accessing frequency of the application and based on user priority.

11. The method according to claim 8, wherein the prioritising of queries is made according to query priority and application rank is used based on determining that the query priorities of two or more queries are the same.

12. The method according to claim 8, further comprising filtering the received queries based on common query rules.

13. A computer program for handling queries in a federated database system, the computer program product comprising a non-transitory computer readable medium storing computer program code which when run in a query handling device, causes the query handling device to:
- assign, at application deployment, the applications to data-stores of said databases,
- cluster queries based on query execution time, assigning priorities to clusters based on the execution times of the queries of the cluster, ranking the applications,
- rank the applications,
- receive database queries directed towards a group of databases from several applications,
- investigate the queries, where the investigation comprises prioritising between at least some queries according to a query prioritisation scheme which prioritizing comprises selecting queries for execution based on cluster priority and application rank, and
- send the investigated queries to the databases, where queries having been prioritised are sent according to the query prioritisation scheme, wherein the investigating comprises investigating the processing capability of system elements handling a query of an application, comparing the processing capability with a capability criterion, wherein the processing capability is determined based on one or more processing capability parameters of the system elements handling the query, where the query is immediately send to the assigned database and immediately performed if the capability criterion is fulfilled and otherwise the prioritisation is performed according to the query prioritisation scheme, and wherein, for an individual query, the query handling device selects a database from among the group of databases and sends the individual query to the selected database based on the investigation of the query and the processing capability of the system elements.

* * * * *